United States Patent
Bennett (10) Patent No.: US 6,965,488 B1
(45) Date of Patent: Nov. 15, 2005

(54) DISK DRIVE CONTROLLING RIPPLE CURRENT OF A VOICE COIL MOTOR WHEN DRIVEN BY A PWM DRIVER

(75) Inventor: George J. Bennett, Murrieta, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 104 days.

(21) Appl. No.: 10/609,240

(22) Filed: Jun. 27, 2003

(51) Int. Cl.[7] .............................................. G11B 21/02
(52) U.S. Cl. ...................................................... 360/75
(58) Field of Search .............................. 360/75, 77.02, 360/78.04, 78.12; 318/254, 500, 599; 310/307

(56) References Cited

U.S. PATENT DOCUMENTS

| | | | |
|---|---|---|---|
| 5,654,840 A | | 8/1997 | Patton et al. |
| 5,663,846 A | * | 9/1997 | Masuoka et al. ............. 360/75 |
| 5,767,638 A | * | 6/1998 | Wu et al. .................... 318/254 |
| 5,838,515 A | | 11/1998 | Mortazavi et al. |
| 5,857,787 A | | 1/1999 | Ryan |
| 5,973,437 A | * | 10/1999 | Gradzki et al. ............. 310/307 |
| 5,986,426 A | * | 11/1999 | Rowan ........................ 318/599 |
| 6,097,564 A | | 8/2000 | Hunter |
| 6,373,650 B1 | * | 4/2002 | Pedrazzini .................... 360/75 |
| 6,556,461 B1 | * | 4/2003 | Khersonsky et al. .......... 363/41 |
| 6,639,373 B2 | * | 10/2003 | Knight et al. ................ 318/500 |
| 6,711,034 B2 | * | 3/2004 | Duerbaum et al. ........... 363/16 |

* cited by examiner

Primary Examiner—David Hudspeth
Assistant Examiner—Fred F. Tzeng
(74) Attorney, Agent, or Firm—Howard H. Sheerin, Esq.

(57) ABSTRACT

A disk drive is disclosed comprising a pulse width modulated (PWM) signal generator for generating PWM control signals applied to the driver switches of a voice coil motor (VCM). The PWM control signals comprise a PWM cycle time, a Tforward time interval of the PWM cycle time wherein a positive control voltage is applied to the VCM, a Treverse time interval of the PWM cycle time wherein a negative control voltage is applied to the VCM, and a Tdead time interval of the PWM cycle time wherein a substantially zero control voltage is applied to the VCM. The Tdead time interval is adjusted to control a magnitude of an actual ripple current flowing through the VCM.

22 Claims, 7 Drawing Sheets

DISK DRIVE CONTROLLING RIPPLE CURRENT OF A VOICE COIL MOTOR WHEN DRIVEN BY A PWM DRIVER

BACKGROUND OF THE INVENTION

1. Field of the Invention

The present invention relates to disk drives for computer systems. More particularly, the present invention relates to a disk drive controlling ripple current of a voice coil when driven by a pulse width modulated (PWM) driver.

2. Description of the Prior Art

A disk drive typically employs a voice coil motor (VCM) comprising a voice coil which interacts with permanent magnets to rotate an actuator arm about a pivot. A head is connected to a distal end of the actuator arm to actuate it radially over the surface of a disk in order to "seek" the head to a target data track. Once the head is positioned over the target data track, the VCM servo system performs a "tracking" operation wherein the head is maintained over a centerline of the data track while writing data to or reading data from the disk.

Figure 1:
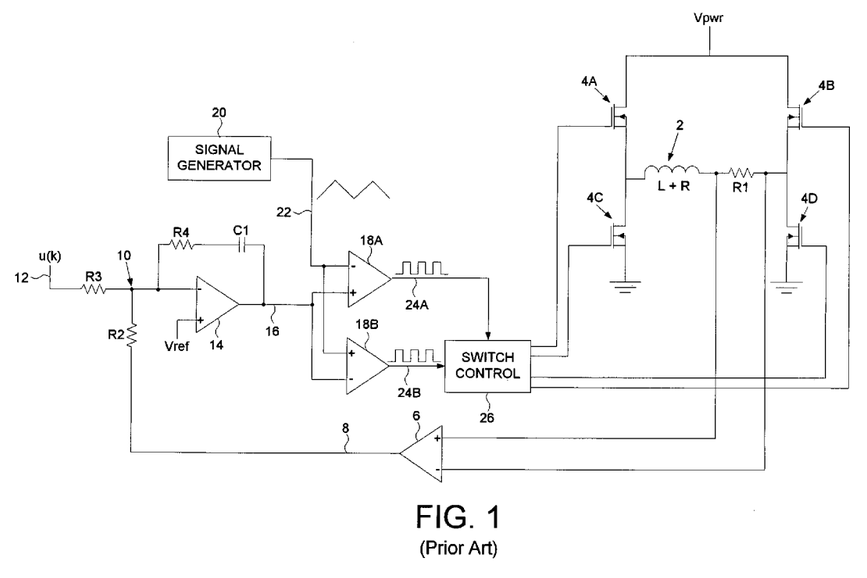
FIG. 1 shows a prior art disk drive employing a transconductance amplifier configuration for driving the VCM in a PWM mode using current feedback.

Conventionally the VCM has been driven using an H-bridge amplifier operating in a linear mode which leads to inefficient power dissipation since the transistors are driven with constant current. Driving the H-bridge amplifier in a pulse width modulated (PWM) mode increases the efficiency by driving the transistors in a switching mode (on-off) so that power dissipation occurs only when the transistors are switched on. FIG. 1 shows a prior art transconductance amplifier configuration for driving the VCM in a PWM mode using current feedback. The VCM comprises a voice coil 2 which has an intrinsic inductance (L) and resistance (R). The voice coil 2 is driven by an H-bridge amplifier comprising driver switches 4A–4D. A sense resistor R1 is connected in series with the voice coil 2, and an amplifier 6 amplifies the voltage across the sense resistor R1 to generate a voltage 8 representing the amplitude of current flowing through the voice coil 2.

The feedback loop established through amplifier 6 turns the voltage driver into a current driver, accomplishing the change from a voltage amplifier into a transconductance amplifier (which turns a voltage command into a current output). The voltage 8 representing the actual voice coil current is subtracted at node 10 from a voltage command u(k) 12 representing a desired voice coil current. The resulting voltage at node 10 is amplified by a high gain error amplifier 14 that generates a voltage command 16 applied to a first input of comparators 18A and 18B. A signal generator 20 generates a triangle waveform 22 applied to a second input of the comparators 18A and 18B. The comparators 18A and 18B generate PWM signals 24A and 24B having a duty cycle proportional to the current command 16. The PWM signals 24A and 24B are applied to switch control 26 which controls the driver switches 4A–4D in order to control the voltage applied to the voice coil 2. Resistor R4 and capacitor C1 in the feedback path between the current command 16 and the input voltage of error amplifier 14 provide lead compensation to compensate for the lag caused by the L/R time constant of the voice coil 2.

There are several drawbacks associated with driving a VCM in a PWM mode as illustrated in FIG. 1. For example, the various analog components of the error amplifier 14 increase the complexity and cost of the VCM driver circuitry. In addition, the periodic operation of the PWM mode introduces additional lag into the transconductance loop which decreases the loop bandwidth. The lead network provided by resistor R4 and capacitor C1 helps compensate for the additional lag, but the lead network must be designed conservatively to prevent instability due to the voice coil resistance drifting as the temperature fluctuates. The PWM lag can also be reduced by increasing the frequency of the PWM signals 24A and 24B, but this reduces the efficiency advantage of operating in a PWM mode. Due to these drawbacks, the VCM has been driven in a PWM mode using the configuration of FIG. 1 only during low bandwidth portions of the seek waveform. During short seeks and tracking operations, the H-bridge amplifier has been driven in a conventional linear mode so that the bandwidth can be increased without losing stability.

There is, therefore, a need to reduce the cost and increase power efficiency of the VCM driver circuitry in a disk drive.

SUMMARY OF THE INVENTION

The present invention may be regarded as a disk drive comprising a disk, a head, and a voice coil motor (VCM) for actuating the head radially over the disk, the VCM comprising a voice coil. The disk drive further comprises a plurality of driver switches for controlling a voltage applied to the voice coil, and a pulse width modulated (PWM) signal generator for generating PWM control signals applied to the driver switches. The PWM control signals comprise a PWM cycle time, a Tforward time interval of the PWM cycle time wherein a positive control voltage is applied to the voice coil, a Treverse time interval of the PWM cycle time wherein a negative control voltage is applied to the voice coil, and a Tdead time interval of the PWM cycle time wherein a substantially zero control voltage is applied to the voice coil. The Tdead time interval is adjusted to control a magnitude of an actual ripple current flowing through the voice coil.

In one embodiment, a first and second end of the voice coil are shorted to ground during the Tdead time interval.

In another embodiment, the Tforward time interval is computed in response to a target ripple current flowing through the voice coil. In one embodiment, the Treverse time interval is computed in response to the Tforward time interval and the target ripple current. In still another embodiment, the Tdead time interval is computed in response to the Tforward and Treverse time intervals. In yet another embodiment, the Tforward and Treverse time intervals are adjusted proportionally in response to a current command.

In an alternative embodiment, the Tdead time interval is computed in response to a target ripple current and a measured ripple current. In one embodiment, the measured ripple current is computed by detecting the current flowing through the voice coil to generate a detected current. The detected current is integrated over a first time interval of the PWM cycle time to generate a negative current measurement, and integrated over a second time interval of the PWM cycle time to generate a positive current measurement. The measured ripple current is computed from a difference between the negative current measurement and the positive current measurement. In one embodiment, the Tforward and Treverse time intervals are computed in response to the Tdead time interval. In yet another embodiment, the Tforward and Treverse time intervals are adjusted proportionally in response to a current command.

In yet another embodiment, the voice coil comprises a resistance R and an effective inductance L, where the effective inductance L is a function of the actual ripple current flowing through the voice coil and the resistance R changes with temperature drift. The Tdead time is adjusted to maintain a substantially constant ratio L/R.

The present invention may also be regarded as a method of controlling ripple current in a voice coil motor (VCM) of a disk drive when driven in a PWM mode. The disk drive comprises a disk, a head, and the VCM for actuating the head radially over the disk, wherein the VCM comprise a voice coil. A Tforward time interval of a PWM cycle time is computed, and a positive control voltage is applied to the voice coil during the Tforward time interval. A Treverse time interval of the PWM cycle time is computed, and a negative control voltage is applied to the voice coil during the Treverse time interval. A Tdead time interval of the PWM cycle time is computed, and a substantially zero control voltage is applied to the voice coil during the Tdead time interval. The Tdead time interval is adjusted to control a magnitude of an actual ripple current flowing through the voice coil.

DESCRIPTION OF THE PREFERRED EMBODIMENTS

Figure 2:
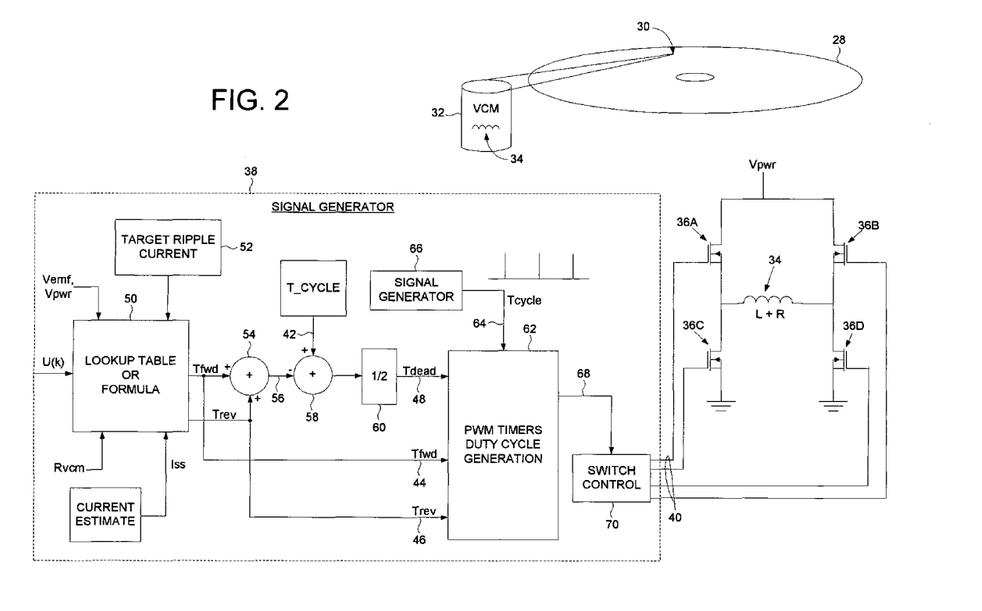
FIG. 2 shows a disk drive according to an embodiment of the present invention employing a pulse width modulated (PWM signal generator generating PWM control signals for controlling the VCM by applying a positive voltage to the VCM during a Tforward time interval, a negative voltage to the VCM during a Treverse time interval, and a substantially zero voltage to the VCM during a Tdead time interval, wherein the Tdead time interval is adjusted to control a magnitude of ripple current flowing through the VCM.

FIG. 2 shows a disk drive according to an embodiment of the present invention comprising a disk 28, a head 30, and a voice coil motor (VCM) 32 for actuating the head 30 radially over the disk 28, the VCM 32 comprising a voice coil 34. The disk drive further comprises a plurality of driver switches 36A–36D for controlling a voltage applied to the voice coil 34, and a pulse width modulated (PWM) signal generator 38 for generating PWM control signals 40 applied to the driver switches 36A–36D. The PWM control signals 40 comprise a PWM cycle time 42, a Tforward time interval 44 of the PWM cycle time 42 wherein a positive control voltage is applied to the voice coil 34, a Treverse time interval 46 of the PWM cycle time 42 wherein a negative control voltage is applied to the voice coil 34, and a Tdead time interval 48 of the PWM cycle time 42 wherein a substantially zero control voltage is applied to the voice coil 34. The Tdead time interval 48 is adjusted to control a magnitude of an actual ripple current flowing through the voice coil 34.

Maintaining a constant ripple current is mathematically similar to holding the inductance L of the voice coil 34 constant regardless of circuit voltages resulting in predictable performance. In one embodiment, the ripple current is adjusted so that the inductance L tracks variations in the resistance R of the voice coil 34 due to temperature drift, thereby maintaining a substantially constant effective L/R time constant. In this manner the lag due to the L/R time constant can be canceled using well known analog and/or digital feedforward compensation (pole-zero cancellation). The feedforward compensation enables the use of lower gain circuits which reduces the total bandwidth requirement allowing lower speed and less expensive digital techniques to replace analog compensation loops. In addition, maintaining a substantially constant L/R time constant compensates for the time lag introduced by the PWM cycle time.

The average current Iss flowing through the voice coil 34 during the PWM cycle time is approximated by:

$$Iss = \frac{[((Vpwr - Vemf) \cdot Tfwd + (-Vpwr - Vemf) \cdot Trev) - 2 \cdot Tdead \cdot Vemf]}{Rvcm \cdot Tcyc}$$

where:
  Vpwr is the supply voltage;
  Vemf is the back emf voltage across the coil;
  Rvcm is the resistance of the voice coil; and
  Tcyc is the PWM cycle time.

The Tforward time interval (Tfwd) can be computed for any given ripple current dl:

$Tfwd = dI \cdot L/[Vpwr - Vemf - Iss \cdot Rvcm]$

The current Ishort flowing through the voice coil 34 if the Treverse time interval (Trev) is zero can be calculated as:

$Ishort = [(Rvcm \cdot Iss + Vemf) \cdot (Tcyc - Tfwd)]/L$

From this equation the Treverse time interval (Trev) can be calculated as:

$Trev = (dI - Ishort) \cdot L/Vpwr$ and the Tdead interval computed as:

$Tdead = (Tcyc - Tfwd - Trev)/2$

Referring again to FIG. 2, the signal generator 38 comprises a LOOKUP TABLE OR FORMULA 50 for implementing the above equations to generate the Tforward and Treverse time intervals. A register 52 is programmed with a target ripple current value, the Vpwr is a known input, and Vemf, Rvcm and Iss inputs are either estimated or measured. In one embodiment, the target ripple current is selected to give uniform response throughout the small signal region (about 10% of full scale output current). The Tforward and Treverse time intervals are adjusted proportionally in response to a current command U(k) in order to change the average voltage applied to the voice coil 34 according to the commanded current. The Tforward and Treverse time intervals are summed 54, and the result 56 subtracted 58 from the PWM cycle time 42 to generate Tdead·2 which is scaled by half 60 to generate the Tdead time interval 48. The Tforward, Treverse, and Tdead time intervals are input into a PWM TIMERS DUTY CYCLE GENERATION block 62 which uses a pulse train 64 generated by a signal generator 66 to generate control signals 68 applied to a switch control block 70. The switch control block 70 generates the appropriate PWM control signals 40 applied to the driver switches 36A–36D.

Figure 3A:
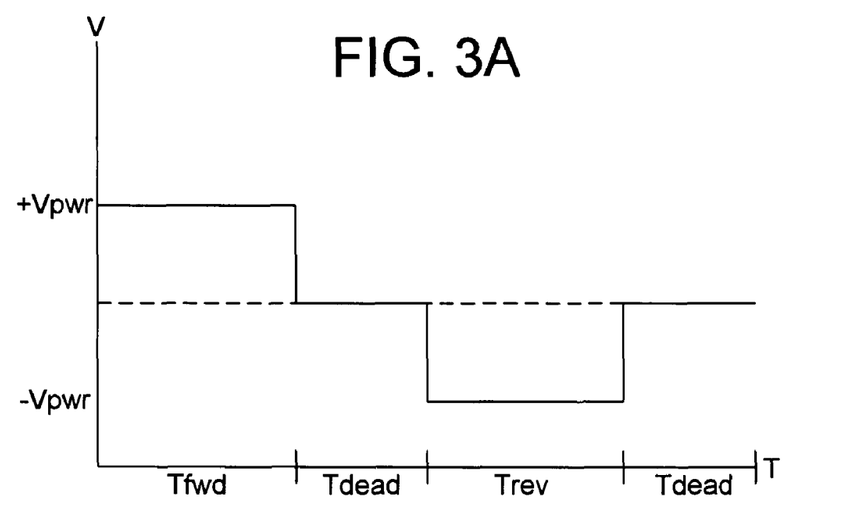
FIG. 3A illustrates a PWM cycle time wherein the positive voltage is applied to the VCM during the Tforward time interval, the negative voltage is applied to the VCM during the Treverse time interval, and a substantially zero voltage is applied to the VCM during the Tdead time interval.
Figure 3B:
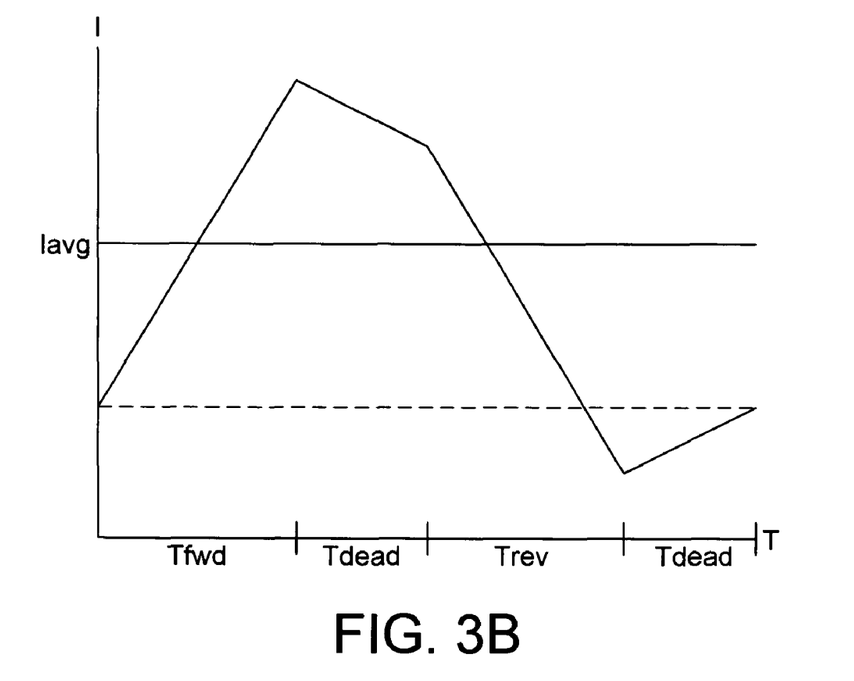
FIG. 3B illustrates the ripple current flowing through the VCM during the PWM cycle time of FIG. 3A.

FIG. 3A shows the voltages applied to the voice coil 34 over a PWM cycle time. A positive voltage (+Vpwr) is applied to the voice coil 34 during the Tforward time interval, a negative voltage (−Vpwr) is applied to the voice coil 34 during the Treverse time interval, and a substantially zero voltage is applied to the voice coil 34 during the Tdead time interval. In one embodiment, the ends of the voice coil 34 are shorted to ground during the Tdead time interval. FIG. 3B illustrates the ripple current flowing through the voice coil 34 during the PWM cycle time of FIG. 3A. The target ripple current programmed into register 52 of FIG. 2 is the peak-to-peak amplitude of the ripple current shown in FIG. 3B.

Figure 4:
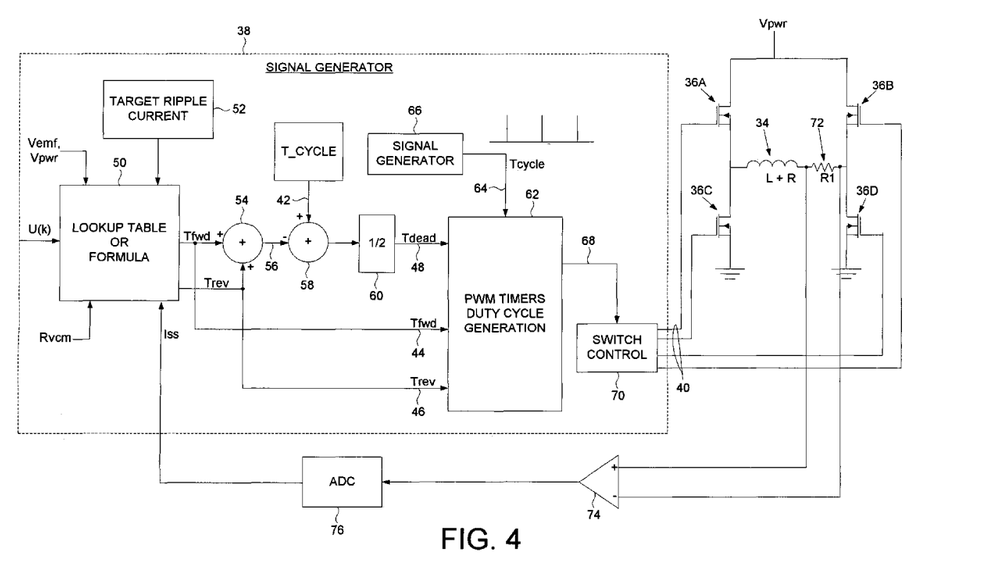
FIG. 4 shows a disk drive according to an embodiment of the present invention wherein a sense resistor detects the current flowing through the VCM which is used to generate the Tforward, Treverse and Tdead time intervals.

FIG. 4 shows an embodiment of the present invention wherein the average current Iss flowing through the voice coil 34 is measured using a sense resistor 72 in series with the voice coil 34. An amplifier 74 amplifies the voltage across the sense resistor 72, and an A/D converter 76 converts the amplified signal into a digital signal for processing by the LOOKUP TABLE OR FORMULA 50.

Figure 5:
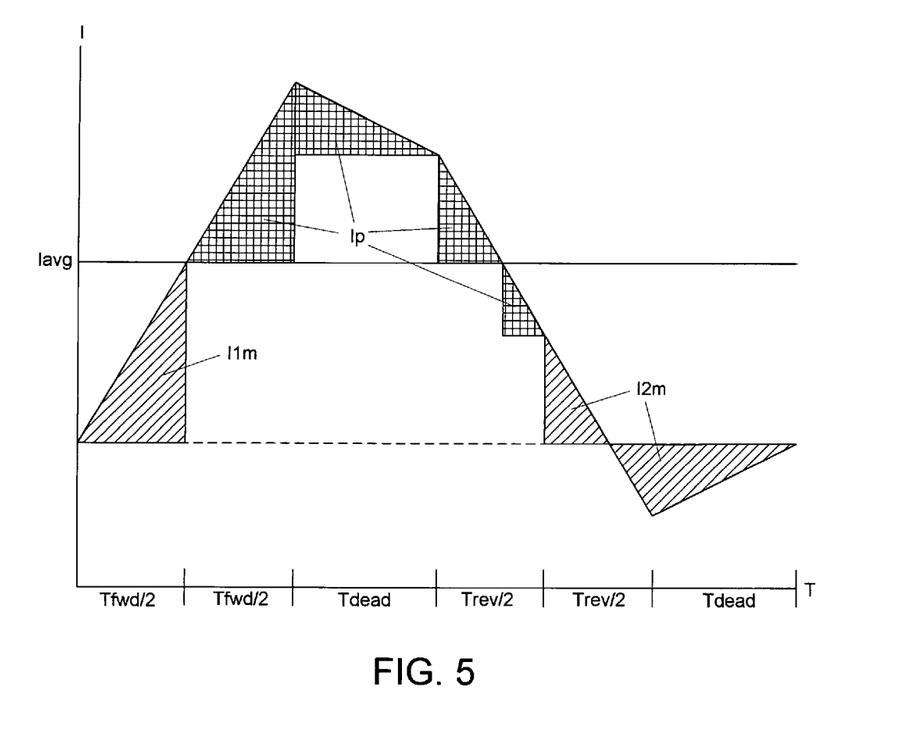
FIG. 5 shows an embodiment of the present invention wherein the current flowing through the VCM is integrated to generate an actual ripple current measurement.

In another embodiment of the present invention, the Tdead time interval 48 is computed in response to a target ripple current (dI) and a measured ripple current Iripple. The measured ripple current Iripple is generated by detecting the current flowing through the voice coil 34 to generate a detected current. The detected current is integrated during a first interval to generate a negative current measurement, and integrated during a second time interval to generate a positive current measurement. The measured ripple current is then generated by computing a difference between the negative current measurement and the positive current measurement. This embodiment is illustrated in FIG. 5 wherein the detected current flowing through the voice coil 34 is integrated over a first half of the Tforward time interval to generate I1m. The detected current is then integrated over the second half of the Tforward time interval, the first Tdead time interval, and the first half of the Treverse time interval to generate Ip. The detected current is then integrated over the second half of the Treverse time interval and the second Tdead time interval to generate I2m. The current measurements I1m and I2m are then added to generate the negative current measurement Im. The measured ripple current Iripple is computed as:

$$Iripple = 2 \cdot (Im - Ip)$$

Figure 6:
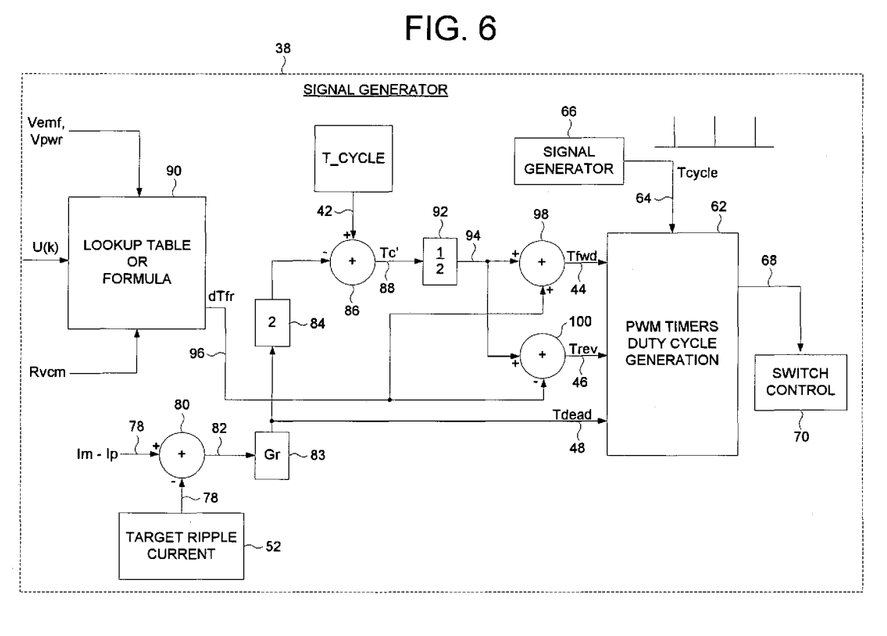
FIG. 6 shows an embodiment of the present invention wherein the measured ripple current is subtracted from a target ripple current to generate an error ripple current for adjusting the Tdead time interval.

FIG. 6 shows an embodiment of the present invention wherein the target ripple current stored in register 52 is subtracted 80 from the measured ripple current Im−Ip 78 to generate an error ripple current 82 for adjusting the Tdead time interval 48. The error ripple current 82 is multiplied by a gain 83 to generate the Tdead time interval 48. The Tdead time interval 48 is multiplied by two 84 and the result subtracted 86 from the PWM cycle time 42 to generate an adjusted PWM cycle time 88 which is divided by two 92 to generate time interval 94. A LOOKUP TABLE OR FORMULA 90 processes the Vemf, the Vpwr, the Rvcm, and the current command input U(k) to generate an appropriate adjustment dTfr 96 in order to change the average voltage applied to the voice coil 34 according to the commanded current. The adjustment dTfr 96 is added 98 to the time interval 94 to generate the Tforward time interval 44 and subtracted 100 from the time interval 94 to generate the Treverse time interval 46. A suitable value for the gain 83 is selected to achieve a desired overall response.

Figure 7:
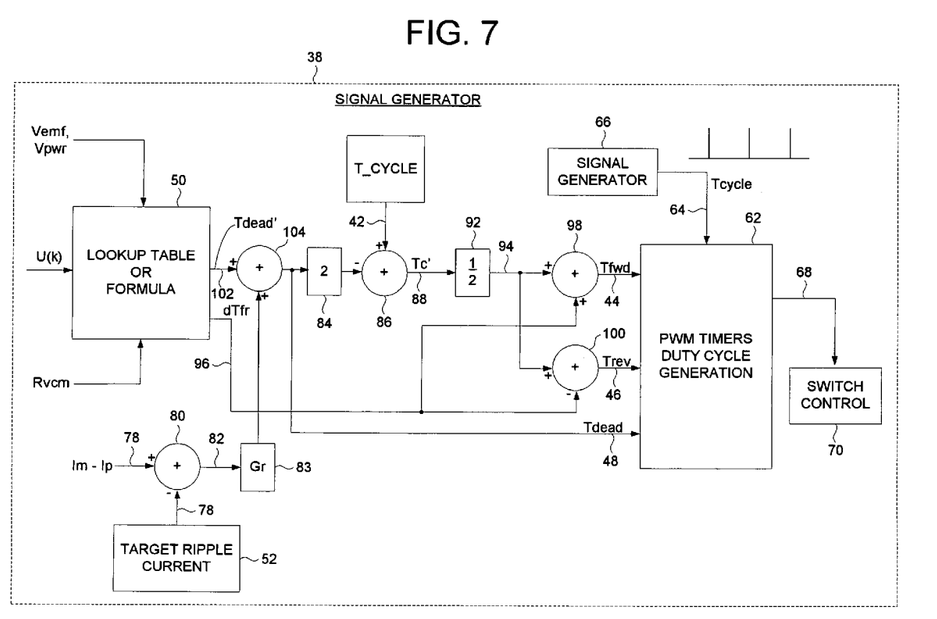
FIG. 7 shows an embodiment of the present invention wherein a nominal Tdead time interval is computed and then adjusted by the error ripple current.

FIG. 7 shows an embodiment of the present invention wherein the embodiments of FIG. 2 and FIG. 6 are combined. In this embodiment, the LOOKUP TABLE OR FORMULA 50 generates a nominal Tdead' time interval 102 using the same equations as described above with reference to FIG. 2. The nominal Tdead' time interval 102 is added 104 to the error ripple current 82 (after being multiplied by the gain 83) to generate the Tdead time interval 48. This embodiment improves the response of the ripple current loop requiring a smaller value for the gain 83.

We claim:
1. A disk drive comprising:
 (a) a disk;
 (b) a head;
 (c) a voice coil motor (VCM) for actuating the head radially over the disk, the VCM comprising a voice coil;
 (d) a plurality of driver switches for controlling a voltage applied to the voice coil; and
 (e) a pulse width modulated (PWM) signal generator for generating PWM control signals applied to the driver switches, the PWM control signals comprising:
  a PWM cycle time;
  a Tforward time interval of the PWM cycle time wherein a positive control voltage is applied to the voice coil;
  a Treverse time interval of the PWM cycle time wherein a negative control voltage is applied to the voice coil; and
  a Tdead time interval of the PWM cycle time wherein a substantially zero control voltage is applied to the voice coil, wherein the Tdead time interval is adjusted to control a magnitude of an actual ripple current flowing through the voice coil.

2. The disk drive as recited in claim 1, wherein a first and second end of the voice coil are shorted to ground during the Tdead time interval.

3. The disk drive as recited in claim 1, wherein the Tforward time interval is computed in response to a target ripple current flowing through the voice coil.

4. The disk drive as recited in claim 3, wherein the Treverse time interval is computed in response to the Tforward time interval and the target ripple current.

5. The disk drive as recited in claim 4, wherein the Tdead time interval is computed in response to the Tforward and Treverse time intervals.

6. The disk drive as recited in claim 5, wherein the Tforward and Treverse time intervals are adjusted proportionally in response to a current command.

7. The disk drive as recited in claim 1, wherein the Tdead time interval is computed in response to a target ripple current and a measured ripple current.

8. The disk drive as recited in claim 7, wherein the measured ripple current is computed by:
 (a) detecting the current flowing through the voice coil to generate a detected current;

(b) integrating the detected current over a first time interval of the PWM cycle time to generate a negative current measurement;

(c) integrating the detected current over a second time interval of the PWM cycle time to generate a positive current measurement; and (d) computing a difference between the negative current measurement and the positive current measurement.

9. The disk drive as recited in claim 8, wherein the Tforward and Treverse time intervals are computed in response to the Tdead time interval.

10. The disk drive as recited in claim 9, wherein the Tforward and Treverse time intervals are adjusted proportionally in response to a current command.

11. The disk drive as recited in claim 1, wherein:
(a) the voice coil comprises a resistance R and an effective inductance L;
(b) the effective inductance L is a function of the actual ripple current flowing through the voice coil;
(c) the resistance R changes with temperature drift; and
(d) the Tdead time is adjusted to maintain a substantially constant ratio L/R.

12. A method of controlling ripple current in a voice coil motor (VCM) of a disk drive when driven in a PWM mode, the disk drive comprising a disk, a head, and the VCM for actuating the head radially over the disk, wherein the VCM comprise a voice coil, the method comprises the steps of:
(a) computing a Tforward time interval of a PWM cycle time;
(b) applying a positive control voltage to the voice coil during the Tforward time interval;
(c) computing a Treverse time interval of the PWM cycle time;
(d) applying a negative control voltage to the voice coil during the Treverse time interval;
(e) computing a Tdead time interval of the PWM cycle time;
(f) applying a substantially zero control voltage to the voice coil during the Tdead time interval; and
(g) adjusting the Tdead time interval to control a magnitude of an actual ripple current flowing through the voice coil.

13. The method as recited in claim 12, further comprising the step of shorting a first and second end of the voice coil to ground during the Tdead time interval.

14. The method as recited in claim 12, wherein the Tforward time interval is computed in response to a target ripple current flowing through the voice coil.

15. The method as recited in claim 14, wherein the Treverse time interval is computed in response to the Tforward time interval and the target ripple current.

16. The method as recited in claim 15, wherein the Tdead time interval is computed in response to the Tforward and Treverse time intervals.

17. The method as recited in claim 16, further comprising the step of adjusting proportionally the Tforward and Treverse time intervals in response to a current command.

18. The method as recited in claim 12, wherein the Tdead time interval is computed in response to a target ripple current and a measured ripple current.

19. The method as recited in claim 18, wherein the measured ripple current is computed by:
(e) detecting the current flowing through the voice coil to generate a detected current;
(f) integrating the detected current over a first time interval of the PWM cycle time to generate a negative current measurement;
(g) integrating the detected current over a second time interval of the PWM cycle time to generate a positive current measurement; and
(h) computing a difference between the negative current measurement and the positive current measurement.

20. The method as recited in claim 19, wherein the Tforward and Treverse time intervals are computed in response to the Tdead time interval.

21. The method as recited in claim 20, further comprising the step of adjusting proportionally the Tforward and Treverse time intervals in response to a current command.

22. The method as recited in claim 12, wherein:
(a) the voice coil comprises a resistance R and an effective inductance L;
(b) the effective inductance L is a function of the actual ripple current flowing through the voice coil;
(c) the resistance R changes with temperature drift; and
(d) the Tdead time is adjusted to maintain a substantially constant ratio L/R.

* * * * *